United States Patent [19]

Minini

[11] 3,796,458

[45] Mar. 12, 1974

[54] BOWL-SHAPED AUTOMOBILE

[76] Inventor: Katherine Minini, 445 S. 3rd St.-11, San Jose, Calif. 95112

[22] Filed: Jan. 18, 1973

[21] Appl. No.: 324,759

[52] U.S. Cl. .......... 296/35 R, 296/28 B, 296/137 R
[51] Int. Cl. .............................................. B60j 7/00
[58] Field of Search ............ 180/89, 77 S; 296/1 R, 296/65 R, 137 R, 28 R, 28 B, 35 R; 280/1.11; D14/3 G

[56] References Cited
UNITED STATES PATENTS

| | | | |
|---|---|---|---|
| 22,304 | 12/1858 | Potter | 296/65 R |
| D158,133 | 4/1950 | Salisbury | D14/3 G |
| D181,221 | 10/1957 | Moorehead | D14/3 G |
| D218,229 | 8/1970 | Ponthieu | D14/3 G |
| 3,325,180 | 6/1967 | Bandini | 296/28 R |
| 3,358,850 | 12/1967 | Neils | 280/1.11 R X |
| 3,347,557 | 10/1967 | Cruson | 280/1.11 R |

FOREIGN PATENTS OR APPLICATIONS 1,432,987  2/1966  France ............................. 180/77 S

*Primary Examiner*—Kenneth H. Betts

[57] ABSTRACT

A bowl shaped toy automobile consisting primarily of a rotatable body structure supported upon ballbearings, the base of the device being supported upon wheels.

1 Claim, 2 Drawing Figures

PATENTED MAR 12 1974

3,796,458

BOWL-SHAPED AUTOMOBILE

This invention relates to vehicles, and more particularly to a toy bowl car.

It is therefore the principal object of this invention to provide a car which will be of such structure so as to be safe in use and will be primarily used by young people from the age of 12 into the early teens.

Another object of this invention is to provide a car of the type described which will be compact in design and will provide complete enclosure means for the user.

Still another object of this invention is to provide a bowl car which will include a rotatable body member having a transparent upper structure with a clear plastic bubble top and a hinged hatch for entrance into the body of the car.

Yet another object of this invention is to provide a car of the type described which will include ballbearings within the base structure so as to enable the body to be rotatable thereon.

A further object of this invention is to provide a car of the type described which will have pedal means for securing the body stationary to the ballbearing structure of the base, when desired.

Other objects of the invention are to provide a car which will be simple in design, inexpensive to manufacture, rugged in construction, easy to use and efficient in operation.

These and other objects will be readily evident upon a study of the following specification together with the accompanying drawing wherein.

Figure 1:
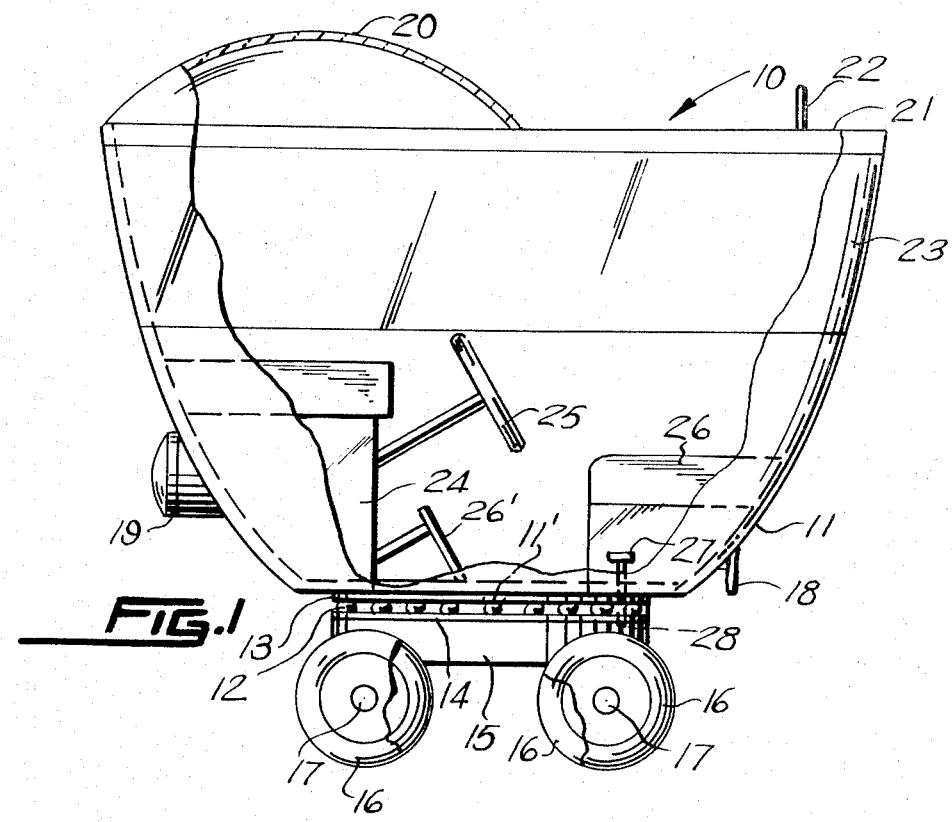
FIG. 1 is a side view of the present invention shown in elevation and partly broken away.
Figure 2:
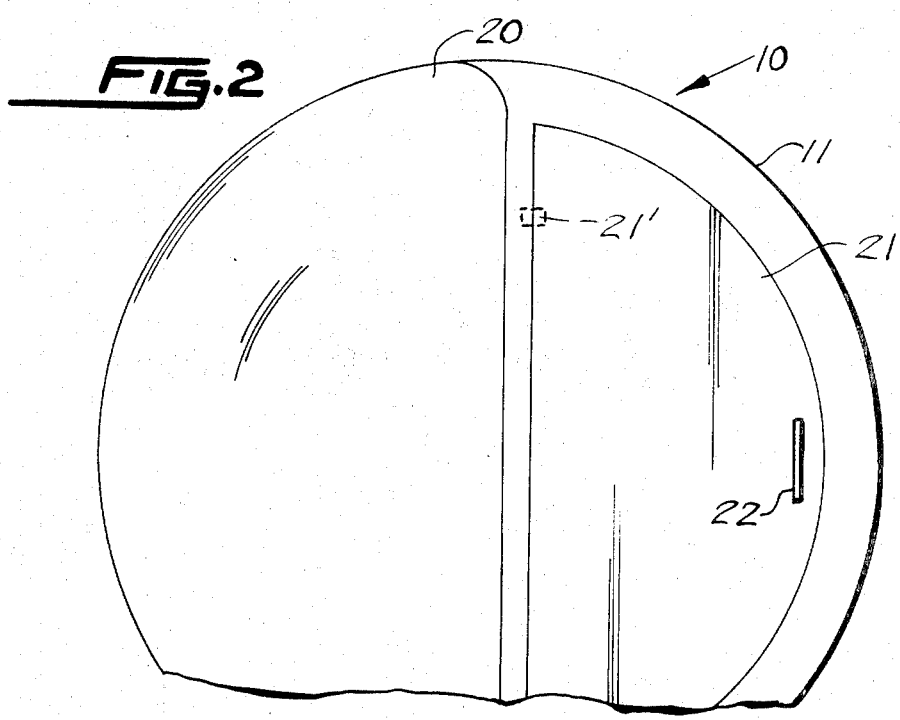
FIG. 2 is a fragmentary top plan view of FIG. 1.

According to this invention, a bowl car 10 is shown to consist of a bowl-shaped configurated body 11 which is secured by shaft 11' above ballbearings 12 carried between bearing races 13 and 14. Ballbearing race 14 is secured fixedly to the top of base structure 15. A plurality of spaced apart wheels 16 are secured to a pair of axles 17 carried by base 15. On the exterior of body 11 is secured in a suitable manner (not shown) a mock license plate 18 and on the opposite side of body 11 extends a pair of head lamps 19 (one of which is shown).

Extending from the top portion of body 11 is a clear bubble top 20 which is adjacent to a hatch 21 pivotable by means of hinges 21' (one of which is shown). Hatch 21 is provided with a liftable handle 22 so as to enable the user to enter the body 11.

It will be noted that the upper structure 23 of body 11 is transparent in order that the occupant may see outside.

Secured on the interior of body 11 in the vicinity of the head lamps 19, is a motor 24, the cover of which enables the steering wheel 25 to extend. The user is provided with a seat 26 which is spaced apart from the motor 24 and a foot pedal 26' provides a means for operating the motor 24.

Alongside of seat 26 is a foot pedal 27 for use in rendering the body 11 stationary at any desired rotated position, the pedal 27 entering in one of a plurality of openings (not shown) 28, thus rendering the body 11 stationary at any desired position upon the base 15.

It shall also be noted that the ballbearings 12 provide a means of reducing friction to a minimum during the rotation of body 11 upon the base 15.

In use, the base 15 and the wheels 16 remain stationary when the operator rotates the body 11 through a common gearing arrangement.

What I claim is:

1. A car comprising a hollow bowl shaped body, a base rotatably secured to said body and carrying a plurality of ground engaging wheels, seat means carried within said body for a driver, a clear bubble top and hatch means for entering said body carried by said car, a stop pedal for controlling rotation of said body relative to the base carried by said car, said body being rotatable about a central pivot axis relative to said base, the upper portion of said bowl shaped body being transparent for viewing outside said car and the top surface of said body of said car including said clear bubble top for observation outside said body, said bubble top being adjacent to said hatch, said hatch being hingedly secured to the top portion of said car, said hatch having handle grip means for lifting it upwards from the exterior of said car.

* * * * *